(12) United States Patent
Gatz et al.

(10) Patent No.: US 6,368,508 B1
(45) Date of Patent: Apr. 9, 2002

(54) METHOD AND APPARATUS FOR SINGLE REACTOR WASTEWATER TREATMENT SYSTEM

(76) Inventors: Henning Gatz, 916 Jersey St., Bellingham, WA (US) 98225; John G. Malinka, 825 Meadowlawn Ct., Sarfell, MN (US) 56377; Prince A. Wallace, 8285 Kentucky Ave. S., Bloomington, MO (US) 55438

( * ) Notice: Subject to any disclaimer, the term of this patent is extended or adjusted under 35 U.S.C. 154(b) by 0 days.

(21) Appl. No.: 09/358,797

(22) Filed: Jul. 21, 1999

Related U.S. Application Data
(60) Provisional application No. 60/093,636, filed on Jul. 21, 1998, now abandoned.

(51) Int. Cl.[7] ................................................. C02F 3/30
(52) U.S. Cl. .................. 210/630; 210/758; 210/703; 210/801
(58) Field of Search ................... 210/630, 758, 210/703, 221.1, 532.2, 801

(56) References Cited

U.S. PATENT DOCUMENTS
5,788,836 A * 8/1998 Davis

OTHER PUBLICATIONS
www.auri.org/clients/aquacare.htm.*
www.aquacareinternational.com/features.htm.*
www.aquacareinternational.com/techfeatures.htm.*
www.aquacareinternational.com/opfeatures.htm.*
www.aquacareinternational.com/specs.htm.*
www.ecm–inc.com/capitol/1999/august/08061cmr.html (posted Aug. 6, 1999).*
www.house.leg.state.mn.us/cco/journals/1999–00/j0427052.html.*
www.eerc.und.nodak.edu/watman/august99.html.*

* cited by examiner

Primary Examiner—Chester T. Barry
(74) Attorney, Agent, or Firm—Todd N. Hathaway (57) ABSTRACT

A method and apparatus for biologic treatment of wastewater using both aerobic and anoxic phases. The flow of influent entering the reactor tank is slowed by a conical influent structure and discharged against the bottom of the reactor tank, so that the influent flows outwardly under a sludge blanket near the bottom of the tank without disrupting the blanket. The sludge blanket acts as a cap which prevents the influent from flowing directly to an outflow opening during decanting of the tank. The sludge blanket is dispersed and mixed in the tank during the aerobic and anoxic treatment phases. The invention also provides for treatment of manure-laden wastewater discharged from a confined animal facility, such as a feed yard, pig farm or dairy. The manure solids are separated from the wastewater flow before the wastewater enters the reactor tank. The wastewater is returned to the facility for reuse, and the manure solids can be disposed of in dry form as fertilizer.

14 Claims, 5 Drawing Sheets

METHOD AND APPARATUS FOR SINGLE REACTOR WASTEWATER TREATMENT SYSTEM

This application claims the benefit of provisional application 60/093,636 filed on Jul. 21, 1998 now abandoned.

FIELD OF THE INVENTION

The present invention relates generally to sewage treatment, and, more particularly, to a wastewater treatment system in which both aerobic and anoxic treatment functions are carried out in a single vessel.

BACKGROUND OF THE INVENTION

It is well known in the relevant art that the most effective treatment of sewage and other organic-laden wastewater employs digestion by both aerobic and anaerobic microbes. During the aerobic stage (during which the liquor is usually aerated by artificial means), a first group of bacteria metabolizes the waste and carries out nitrification functions. Denitrification is then performed by a second group of bacteria during the anoxic (sometimes referred to as the anaerobic) phase. After the waste has been treated through one or more complete nitrogen cycles the liquid is separated from the microbes by decanting the liquid and transferring it out of the system.

Most prior art systems of this type have employed at least two separate treatment tanks, one for the aerobic phase and the other for the anoxic. However, the dual-tank approach results in duplication of components and the need for extra monitoring and transfer equipment, and so adds greatly to the capital costs, space requirements, operating expenses, and maintenance requirements of these systems.

Because of these problems, there have been some previous attempts to develop systems in which both the aerobic and anoxic treatment phases are carried out in a single tank or vessel. While some of these systems have had a degree of success when used with single-family dwellings and other small installations, in general they have not proven suitable for larger installations, such as industrial or municipal wastewater treatment facilities. Where there are comparatively large influent flows, these tend to stir up the sludge from the bottom of the tank, causing the waste solids and influent bacteria to become suspended in the water column and rendering it impossible to safely decant the liquid.

One type of system which has attempted to deal with this problem is disclosed in U.S. Pat. Nos. 5,186,821, 5,234,580, and 5,384,049, all to D. Thomas Murphy. Each of these systems includes a collector or chamber having baffles which slow the influent flow, so that the solids settle out and create a "prestratification zone" above the sludge layer (see area 27 in the Murphy patents); the fluids pass through the prestratification zone and are "filtered" before entering the tank. The system also includes a programmable timer for cyclical aeration, settling and decanting of the tank.

As noted above, however, the systems shown in the Murphy patents are believed to be suitable only for fairly small installations, such as for a single family dwelling (similar to a septic tank), in which the decant rate is typically on the order of 10 GPM. For example, the "prestratification zone" is limited by the cross-sectional area available in the lower end of the collector, and cannot hold enough sludge to accommodate the higher influent flow rates in municipal/industrial facilities without having to enlarge the collector beyond economical size limits.

Moreover, large-capacity wastewater treatment systems, particular industrial and municipal systems, are often subject to large fluctuations in influent loads. For example, municipal sewage systems usually receive peak influent loads at morning, noon and early evening, with the influent flow generally being much lower during the rest of the day. The high flow rates which develop at peak loads can disrupt the sludge blanket and hamper the treatment process. Furthermore, the fluctuations in effluent render it difficult or impossible to maintain an optimal food-to-microbe ratio (referred to as the "FTM ratio") when using a conventional single tank system, which is necessary in order to retain a microbe population which is large enough to fully metabolize the waste during peak periods: The is complete life cycle of the microbes spans only about twenty minutes, so that the system must contain enough food to support a large population over a several generations, through the many hours when there is little fresh food (influent) entering the system.

The microbes are capable of employing the sludge layer as food. In conventional single tank systems, however, it would be difficult or impossible to maintain sludge layer a large enough to support the microbe population while still being able to decant the clear liquid at a satisfactory rate, especially if influent flows were disturbing the sludge blanket during peak periods and causing the material to remain suspended in the water column.

Accordingly, there exists a need for a method and apparatus for single tank treatment of municipal, industrial, and other relatively high volume wastewater flows. Furthermore, there exists a need for such a method and apparatus which will permit the influent to enter the tank or other vessel at a relatively high volumetric rate without causing disruption of a sludge blanket which has settled to the bottom of the tank, and without requiring any complex baffle structure which could introduce eddies or turbulence into the flow. Still further, there exists a need for such a method and apparatus in which the amount of settled sludge material through which the influent must pass upon entering the tank is not constrained by the cross-sectional area of a comparatively small collector or chamber.

SUMMARY OF THE INVENTION

The present invention has solved the problems cited above and is a single tank wastewater treatment system in which a comparatively large amount of accumulated sludge is maintained so as to support large microbial populations between periods of peak influent loads, and in which there is a conically-tapered influent discharge structure which slows the velocity of the influent flow and discharges this against the bottom of the tank, so that the influent flows downwardly and outwardly under the sludge blanket without penetrating or dispersing the latter. The sludge blanket thus serves as a cap which prevents the fresh influent from "short-circuiting" the system and passing directly to the decant assembly. The conical structure slows the flow gradually and smoothly by increasing the effective cross-sectional area of the influent supply conduit, and does not use any form of baffle which would introduce turbulence. The conical structure also has the advantage of presenting a minimal shadow zone in the upper portions of the tank, thereby causing less interference with effective mixing during the aeration phase, and less reduction of the effective volume of the tank, than would corresponding cylindrical or rectangular collectors or chambers.

The present invention also provides a method and apparatus for the treatment of manure-laden wastewater which is discharged from a confined animal operation, such as a feed lot, hog barn, or dairy farm, for example. The manure solids are separated from the wastewater flow before the wastewater enters the reactor tank. After treatment, the wastewater is returned to the facility for reuse, and the manure solids are disposed of in dry form as fertilizer.

DETAILED DESCRIPTION a. Overview

Figure 1:
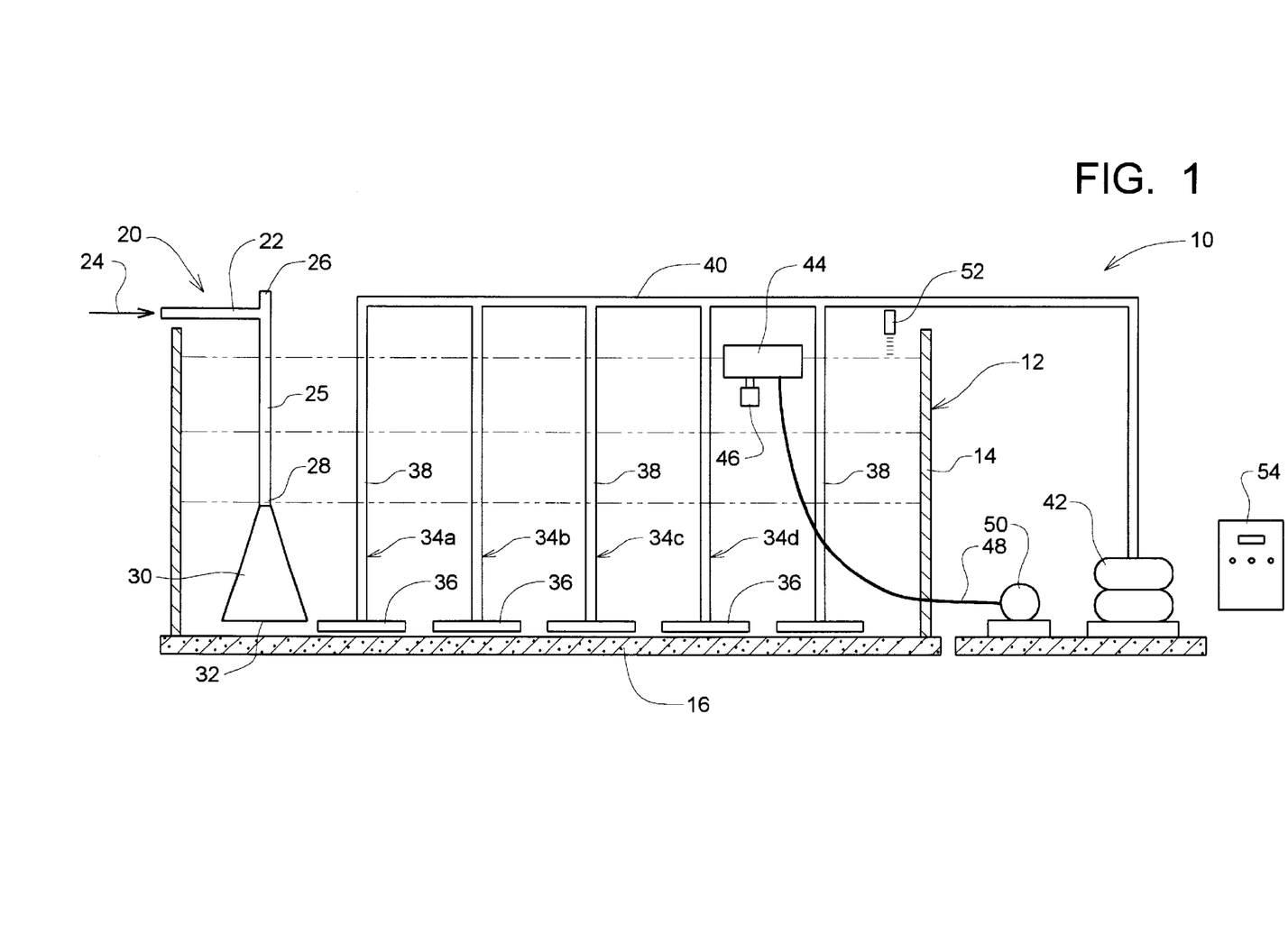
FIG. 1 is a simplified cross-sectional view of a single tank aerobic/anoxic wastewater treatment system in accordance with the present invention, showing the influent assembly towards the left side of the figure, the decant assembly to the right, and a series of submerged aerators for supporting the aerobic phase of the treatment cycle.

FIG. 1 shows the single tank municipal/industrial wastewater treatment system 10 in accordance with the present invention. As can be seen, this includes a single tank 12 having an upstanding wall portion 14 and generally horizontal bottom 16. The tank can be constructed either in or above the ground, using a steel, concrete, or fiberglass wall and a poured concrete bottom, for example. It should be noted that the enhanced metabolic processes and other advantages of the present invention render it more feasible to use a large, above ground tank in many installations, which provides greater capacity at less cost than a comparable buried system.

To the left in FIG. 1 is the influent assembly 20. As can be seen, this receives the flow of untreated influent (e.g., sewage or other municipal/industrial organic-laden wastewater) through a generally horizontal input line 22, and in the direction indicated by the arrow 24. The input line enters a vertical discharge pipe 25 at the "T" connection, with the upper end 26 of the discharge pipe being accessible for maintenance/clean out of the assembly.

The discharge structure 30 is mounted to the lower end 28 of the discharge pipe. As a key aspect of the present invention, the structure 30 has a generally conical form, tapering from an apex at the lower end 28 of the discharge pipe to a wide outflow opening 32 at the bottom. The outflow opening is positioned closely above and is directed towards the bottom of the tank, with the opening being positioned so that it will be well below the top of the sludge blanket during the settling phase, even when the blanket is at its lowest operating level.

A plurality of retrievable submersible aerator units 34a, 34b, etc. extend downwardly into the tank. Each aerator unit includes a diffuser head 36 having a plurality of openings (not shown) through which pressurized air is discharged into the liquor, the diffuser heads being positioned adjacent the bottom of the tank so as to be located generally below the sludge layer when the latter is settled. Air is supplied to the diffuser heads through drop pipes 38, which in turn are connected via a main air supply line 40 to a blower 42.

As will be described in greater detail below, the aerators are used to mix the contents of the tank and supply oxygen for the microbes during the aerobic phase of the treatment cycle. Also, the open-top tank 12 of the illustrated embodiment permits the system to use aerator units which are easily retrievable for maintenance and replacement, unlike closed-top or buried tanks. Furthermore, it will be understood that other forms of aeration systems may also be employed in the present invention, such as a surface aeration/diffused air system with a submersible mixer, or a jet aeration system with a water pump which draws at a suitable level in the tank, for example.

A decant float 44 is located towards the right side of the tank in FIG. 1, generally opposite the influent assembly. The decant float is provided with a submerged intake and check valve 46 on its lower side, and is connected via a flexible hose 48 to a self-priming discharge pump 50. A tank level sensor 52 and programmable control panel 54 control operation of the decant assembly, as well as the other operations of the system.

As will be described in greater detail below, the basic operation of the system is as follows: Fresh influent enters the tank through the influent assembly at a reduced velocity. Using a programmable cycle, the aerators mix and aerate the liquor within the tank 12 when power is applied to the blower 42. Then, during the settling phase, the solids sink to the bottom of the tank and form a sludge blanket which lies above the outflow opening of the conical influent structure. After settling is complete, the discharge pump decants the clarified liquor from the upper portion of the tank, pumping the level down to a point above the top of the sludge blanket. Influent flow continues during the decant cycle, but the conical structure slows the flow and directs it downwardly and outwardly under the sludge blanket, so that the sludge blanket acts as a cap which prevents the untreated influent from "short circuiting" and being pumped out of the system during the decant phase.

Accordingly, the method and apparatus of the present invention are able to accommodate high influent flow rates while still maintaining an effective, uninterrupted treatment cycle. Also, the comparatively deep sludge blanket serves not only as a "cap" over the incoming influent, it also maintains an appropriate food-to-microbe ratio which sustains a microbe population large enough for effective neutralization of waste at peak load periods. Furthermore, this is achieved without having to use any form of baffle structure inside the influent assembly.

b. Influent Structure

Figure 2:
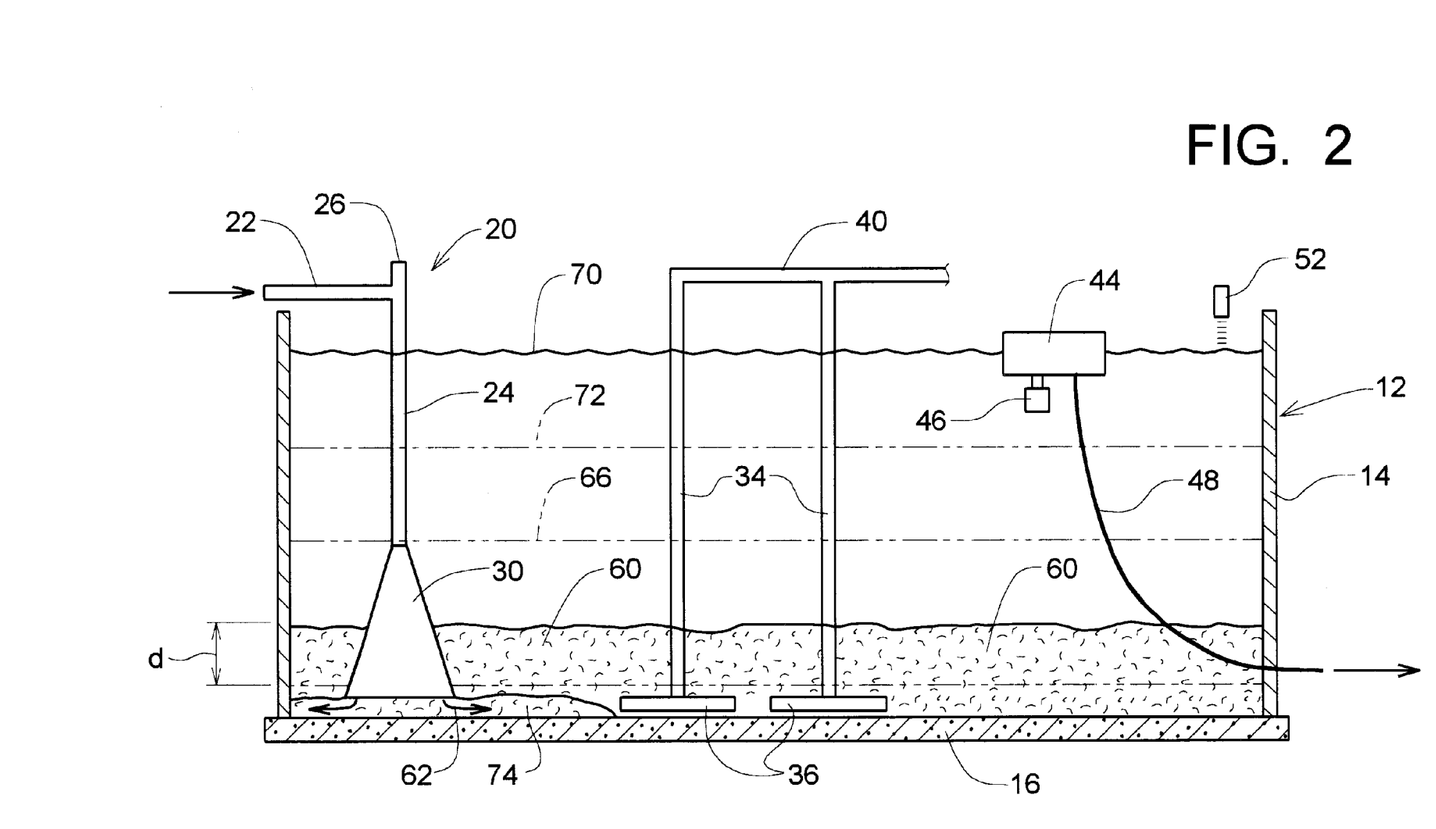
FIG. 2 is a cross-sectional view similar to FIG. 1, showing the relationship of the sludge blanket at the bottom of the tank with the influent flow which is discharged from the bottom of the conical influent structure, other aspects of the system being simplified from FIG. 1 for clarity of illustration.
Figure 3:
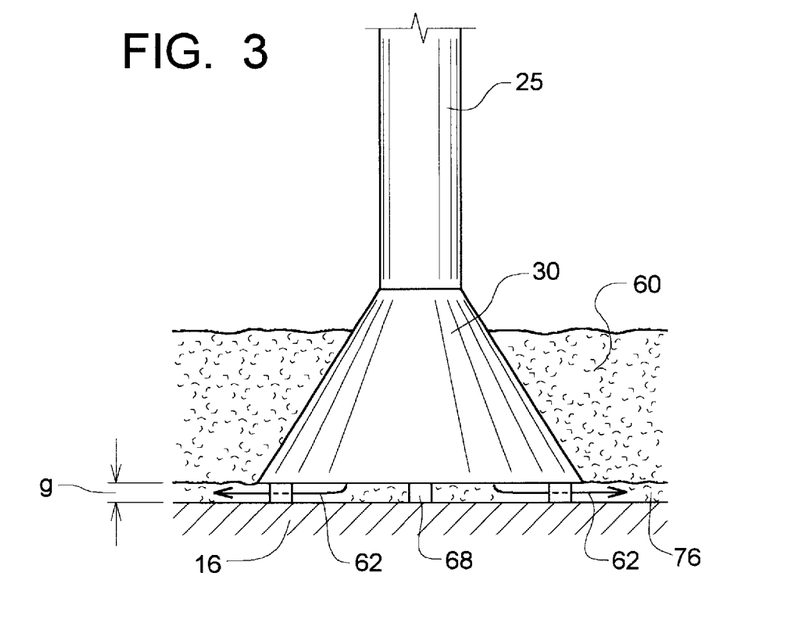
FIG. 3 is an enlarged elevational view of the conical influent structure, showing the relationship between this and the sludge blanket, and also the manner in which the end of the conical structure is supported above the bottom of the tank to form a fixed vertical gap for discharge of the influent flow.
Figure 4:
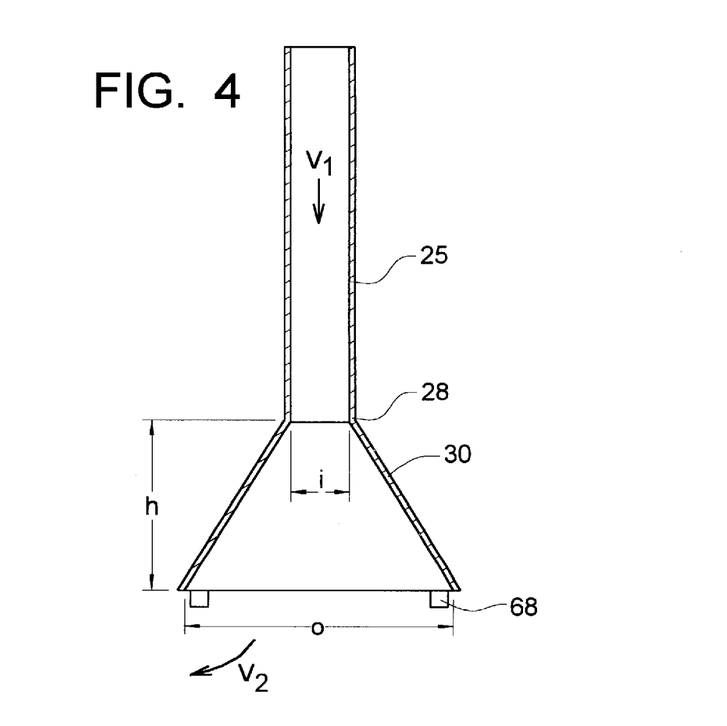
FIG. 4 is a cross-sectional view of the influent pipe and structure of FIG. 3, illustrating the proportional relationship of the components thereof in greater detail.

FIGS. 2–3 show the relationship of the conical influent structure to the sludge blanket and the remainder of the system in greater detail. As can be seen in FIG. 2, the height of the relatively thick sludge blanket 60 at the bottom of the tank is maintained within a predetermined range "d", with the maximum level being about 25% of the maximum liquor depth of the tank, and the minimum level being controlled by the depth of the influent structure opening. For example, for an installation in which the discharge opening of the influent structure is about 6–10" above the bottom of the tank, the lowermost level of the sludge blanket (i.e., the top of the blanket) is normally no less than about 18" above the tank bottom. In terms of actual thickness, an average sludge blanket depth of about 2–3' has been found suitable for many medium-sized installations.

By way of background, the depth of the sludge blanket is determined by taking a sample of the liquor during the aerobic mixing phase and allowing this to settle in a graduated cylinder having a height-to-diameter ratio similar to that of the tank; when settled, the depth of the sludge in the cylinder corresponds to that in the tank itself. Periodic measurements (e.g., once every few days) are sufficient, since the depth of the sludge blanket increases only gradually during operation.

It is important that the influent structure 30 have a generally conical shape (or a shape corresponding closely to this) for two principal reasons: Firstly, a conical taper creates a smooth, gradual increase in the effective diameter of the influent pipe, thereby serving to slow the velocity without creating turbulence. Secondly, the narrow, tapered upper portion of the inlet structure and feed pipe create very little "shadow" in the upper portions of the tank, thereby causing minimal reduction in the effective volume of the tank as compared with systems such as those shown in the Murphy patents.

With regard to the first advantage, i.e., reduced flow velocity, this results from the fact that for a given rate of flow (i.e., a given rate in terms of GPM), the velocity of the flow decreases as the diameter of the conduit containing the flow increases. Hence, by the time the flow reaches the edge of the conical structure at opening 32, the velocity has been reduced to the point where the flow will not break through or disrupt the sludge blanket as it is discharged downwardly against the bottom 16 of the tank and then deflected outwardly, as indicated by arrows 62 in FIGS. 2 and 3. Not only is this slowing of the flow achieved without having to use any form of internal baffle structure, but by creating a smooth, slow-moving flow which expands outwardly under the sludge blanket, the blanket tends to remain intact and forms an effective "cap" over the influent even during times of peak input. Thus, the sludge blanket across the entire bottom of the tank is available to serve as a cap or "filter" for the influent, rather than only a very limited "prestratification zone" in the lower end of a secondary chamber as in the Murphy patents.

The actual dimensions and taper of the conical structure 30 are matter of design choice for individual systems, depending on total capacity, peak flow rates, and other factors. In general, however, the ratio of the input and output diameters of the structure should be selected to reduce a known maximum input velocity to below a predetermined maximum velocity which the sludge blanket can accommodate without disruption. Also (as will be described in greater detail below), it is preferable that the height of the conical structure be such that it extends no further than necessary into the upper reaches of the tank; for example, in the embodiment which is illustrated, the tapered influent structure extends upwardly only to about the midpoint level 66 of the tank. In one exemplary embodiment for a medium size industrial wastewater application, a suitable size of influent structure has an inlet diameter of about 2', an outlet diameter of approximately 12', and an overall height of approximately 7½'.

The conical shape also provides advantages in terms of ease of manufacture. It will be understood, however, that other geometric forms substantially similar to the conical form shown in the drawings may be used in some embodiments, so long as these provide the requisite transition between effective diameters to adequately slow the velocity of the flow.

The spacing between the discharge opening of the conical influent structure and the bottom of the tank is also somewhat a matter of design choice, although a spacing of about 6–10" has been found suitable for most installations in which the settled sludge layer has the range of the thicknesses described above. In the embodiment which is illustrated, a plurality of foot members 68 are mounted around the perimeter of the opening to form the necessary gap "g" above the bottom of the tank.

The second advantage of the conical influent structure is the fact that it creates a comparatively small "shadow" in the upper zones of the tank and therefore results in a minimum impact on the mixing and effective volume of the tank. To illustrate this by way of comparison, the influent collector in the Murphy patents and the somewhat similar "pre-reaction chambers" in other prior systems are ordinarily cylindrical or rectangular chambers which have a more or less uniform cross section from top to bottom. As a result, the upper portions of these chambers displace considerable liquor in the upper reaches of the tank, causing a significant reduction in the effective volume of the main treatment area. Moreover, these large cylindrical or rectangular structures tend to create "shadow zones" which block the mixing and aeration of the liquor, causing partial or inefficient neutralization of the waste in these areas. Since the conical influent structure is wide only at its base, closely adjacent to the bottom of the tank, and only its narrow upper end and the feed pipe extend through the upper portions of the tank, the influent assembly of the present assembly causes comparatively little reduction in the effective volume of the tank and almost no shadow zones to disrupt mixing/aeration. These advantages are of particular importance in those embodiments where a surface aeration system is utilized.

c. Operation

Referring again to FIGS. 2–3, the operation of the present invention will now be described in greater detail.

The treatment cycle utilized by the present invention features four principal phases: (1) aeration, (2) anoxic mixing, (3) settling, and (4) decanting. The duration of each phase is controlled from the programmable control center 54, and influent flow continues freely during all three phases of the cycle.

During the first phase, blower 42 is activated so that a flow of air is discharged from the diffuser heads 36 of the aerators, so that the air disperses the sludge blanket and thoroughly mixes the contents of the tank. This maximizes the amount of microbial food in suspension and increases oxygen levels to cause effective aerobic treatment (nitrification) of the waste.

After a predetermined time, the blower is shut down, and the system enters a period of anoxic mixing during which denitrification takes place, followed by the settling phase. During the settling phase, the sludge and other solids sink to the bottom of the tank, forming a continuous, mud-like layer which extends over both the diffuser heads and the discharge opening of the conical influent structure. During this phase, the aerobic bacteria go dormant, and anoxic metabolism continues.

After allowing sufficient time for the solids to settle out, the decant cycle commences. As can be seen, the decant pump takes a suction near the surface of the liquor and draws it down from a maximum level 70 to a minimum level 72 which is still well above the top of the sludge blanket, so as to eliminate any possibility of any of the sludge or other solids being drawn off accidentally and discharged through the decant assembly. Anoxic neutralization of the materials in the sludge bed naturally continues during the decant phase of the cycle.

The system receives influent at any time without interrupting whatever treatment phase is then in progress. During the mixing/aeration phase, fresh influent entering through conical structure 30 is simply stirred in with the other material in suspension, due to the mixing action generated by the aerators. During the settling phase, however, the influent flows downwardly and then outwardly along the bottom of the tank as has been described above, and as is indicated by regions 74, 76 in FIGS. 2–3, so that the sludge layer is able to settle and form a continuous cap over the top of the influent which prevents the untreated material from flowing directly to the decant float.

As was also noted above, the comparatively large amount of sludge which is maintained in the system not only ensures that a stable cap will be formed over the flow of fresh influent, but it also provides a supply of food to sustain microbe populations which are large enough to handle peak flows of raw material which occur at intervals several hours apart (remembering that the each generation of bacteria spans only about 20 minutes). During periods of low influent flow (i.e., during off-peak hours), both the aerobic and anoxic bacterial populations metabolize the sludge, which consists largely of dead, undigested microbial bodies. Then, when fresh influent enters the system the bacteria preferentially consume the new food, thus maintaining high pass-through rates. Since the sludge only accumulates at a rate of about 15% of real dry matter in the influent flow, the buildup of the sludge blanket itself is quite gradual and does not significantly impact the overall volumetric efficiency of the system.

Cycle times for the mixing, settling and decant phases are again a matter of design choice for an individual system, but in the case of a medium sized municipal/industrial installation such as that which has been described above, about 120 minutes for the aeration phase and about 45 minutes for each of the remaining phases has been found suitable.

d. Confined Animal Operations

Figure 5:
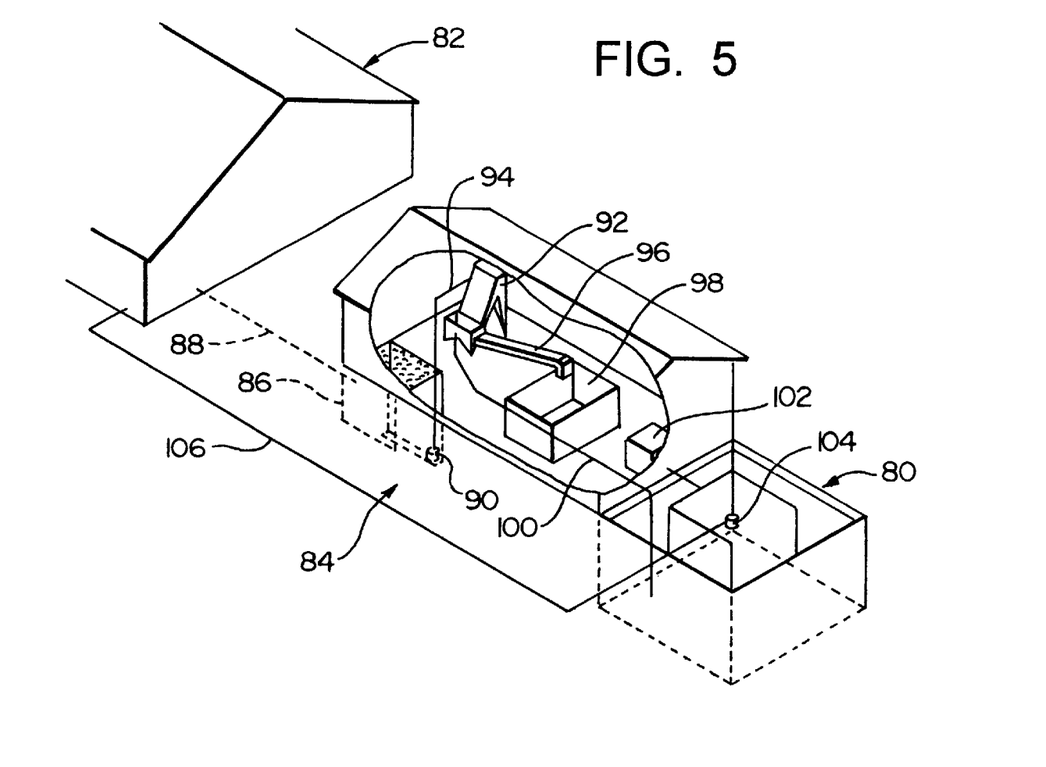
FIG. 5 is a perspective, somewhat schematic view showing a single tank aerobic/anoxic wastewater treatment system in accordance with the present invention, similar to that shown in FIGS. 1–4, installed for treatment of wastewater from a confined animal facility such as a hog farm or dairy operation.
Figure 6:
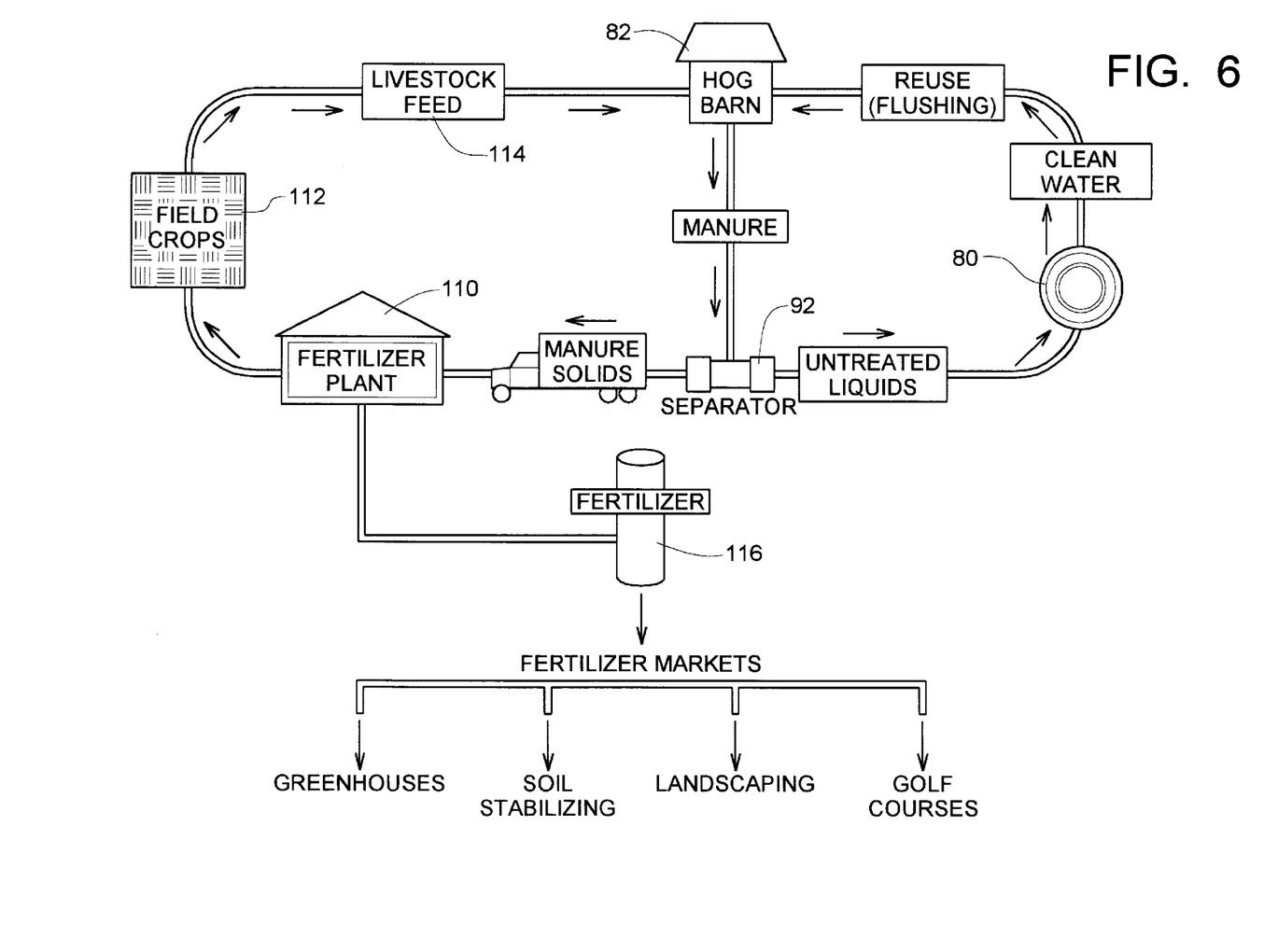
FIG. 6 is a flow chart illustrating the processing of water and manure solids in wastewater from a confined animal facility, as in the installation which is shown in FIG. 5.

FIGS. 5–6 illustrate use of a system in accordance with the present invention to treat wastewater emanating from a confined animal facility, such as a hog farm, dairy operation, feed lot, slaughter house or meat processing plant, for example. While, as was noted above, the system of the present invention can be used for the treatment of wastewater from a wide variety of municipal/industrial sources, confined animal facilities present particularly acute odor and waste disposal problems which can be dealt with in an effective and economical manner using the present invention.

In a confined animal operation a large number of animals are housed within a confined building or other facility, on either a temporary or permanent basis. For example, in some livestock feed operations the animals are raised entirely within the building or other facility, whereas in dairy operations the cows are confined to the building for only part of the time. In either case, the large numbers of animals involved (typically, hundreds or even thousands) produce large amounts of manure which must be removed on a fairly regular basis in order to maintain healthy growing conditions. Removal is normally done by flushing the manure out of the building through troughs or channels, which generates enormous amounts of wastewater carrying high levels of manure solids; for example, a 1400 cow dairy operation will typically produce about 70,000 gallons of manure each day.

While suspended solids can be removed from the wastewater through settling, the manure solids quickly begin to decay if they are left in the wastewater stream. This decay not only causes the intense odors which are associated with confined animal operations, but also leads to high levels of total dissolved solids (TDS) which can only be removed using chemical flocculation or reverse osmosis, both of which are impractical for most agricultural operations. The problem is exacerbated by the common practice of allowing wastewater to accumulate in gutters and pits before being flushed out, sometimes for a period of days. Consequently, the only practical option has generally been to dispose of the water together with the dissolved and suspended solids.

The conventional approach has been to simply take the wastewater and apply this to adjacent fields, either using a spreader tank towed behind a tractor or a manure sprayer. The repeated passage of vehicles and application of liquid, however, tends to cause serious soil compaction problems, necessitating the additional work of having to periodically disk or plow the fields. Moreover, the application of wastewater can combine with natural rainfall to cause excessive runoff and soil erosion. As a result, in many areas regulatory agencies have set limits on the amount of liquid manure that can be applied to a given acreage. For example, under typical limits, a 600 hog farm operation may require about 1200–1500 acres of associated farm land for disposal of the liquid waste; as will be described below, the present invention has made it possible to reduce the required disposal area for such an operation to only about 50 acres.

Another approach, commonly used in dairy farms, has been to simply hold the wastewater in a lagoon adjacent to the barn or other structure. Not only does the lagoon occupy valuable space which could be put to productive use, but it must also be pumped out on a regular basis (typically annually or semi-annually) at considerable expense. Furthermore, manure lagoons often leak and contaminate adjacent streams and ground water; in recent years, environmental enforcement action has forced many dairy farmers to undertake expensive reconstruction or renovation of their lagoons.

It will be noted that the problems described above stem from the fact that, in conventional operations, the manure is disposed of together with the wastewater. The present invention solves these problems by separating the waste stream into solids and liquids, with the liquids being directed to a wastewater reactor such as that which has been described above and the solids being disposed of in dry form as fertilizer. The treated water can then be reused in the animal operation, for flushing or animal consumption, thereby greatly reducing the amount of additional water which is required to support the operation.

As can be seen in FIG. 5, this is accomplished using a wastewater treatment system 80, such as the reactor system 10 which has been described above, to treat the wastewater from the barn or other facility 82, with a separation system 84 being installed to remove the bulk of the manure solids before the water enters the reactor tank.

The solids separation system includes a separation tank 86 which receives the wastewater from the barn via conduit 88. Unlike prior practices, the flushing is carried out on a frequent basis, essentially as soon as the solids are created, so that the wastewater is not allowed to collect or stand for any significant period of time before entering the separation system, thus avoiding the decay which causes odors and high TDS levels.

Wastewater is drawn from the sump of the tank by a pump 90, and is fed to a conventional solids separator 92 via line 94. The manure solids are removed from the wastewater flow by the separator, and are transferred by conveyor 96 to a holding tank 98 for subsequent processing.

The remaining wastewater is fed to the treatment system 80 via line 100. Aerobic and anoxic treatment is then carried out, using controls 102, in substantially the same manner as has been described above with reference to FIGS. 1–4, although cycle times, flow rates and other variables can be adjusted to meet the specific characteristics of the facility and type of waste being treated. A decant float 104 draws off the treated water, in substantially the same manner as described above, and returns it to barn 82 via water line 106. The treated water can be reused for flushing manure from the barn without causing unsanitary conditions, and, since the nitrate levels will usually be well below regulatory limits, can be used as drinking water for the animals; if further cleansing is required, a final "polish" can be provided by UV or ozone treatment.

Hence, the present invention creates a substantially closed loop system, where very little water is discharged with the manure solids and very little new water needs to be added from an outside source. If, however, the water is not to be reused for flushing/feeding, it can be used for irrigation, or discharged into surface waters over a grassed waterway in accordance with applicable environmental regulations.

As can be seen in FIG. 6, turn, the manure solids which have been separated from the wastewater flow are conveyed to a fertilizer plant 110 or similar facility for processing into dry fertilizer. The dry fertilizer can then be applied to crops 112 which produce feed 114 for the livestock in the confined animal operation, thereby reducing expenditures for fertilizer. The fertilizer can also be stored, as indicated at 116, and sold for other purposes.

Alternatively, since the separator 92 removes most of the liquid, the solids are virtually dry when first extracted. These solids soon begin to compost, and in a relatively short time yield a dry, odorless, storable product. In this form, the operator can store the solids and apply them when desired, in essentially the same manner as conventional fertilizers.

To summarize, the present invention virtually eliminates the discharge of wastewater with the manure solids, which in turn eliminates the problems of soil compaction, erosion, and environmental damage which are associated with conventional forms of disposal. The present invention also eliminates virtually all odor associated with confined animal operations, and produces a healthier environment for both the animals and workers. Moreover, the system is compact and economical to operate, with the operating costs due to electricity use ordinarily being exceeded by the savings over conventional approaches. Furthermore, the savings on fertilizer will ordinarily be significant (e.g. $15,000–$20,000 for a typical operation), and in some instances additional revenue may be gained by sale of the fertilizer by-product.

It will be recognized that various alterations, modifications and/or additions may be introduced into the exemplary constructions, arrangements of parts and process steps described above without departing from the spirit or ambit of the present invention.

What is claimed is:

1. A system for treatment of wastewater, said system comprising:

a reactor tank for accumulating a sludge blanket therein so as to support a population of treatment microbes in said tank; and a smoothly tapered conical influent structure having a lower discharge opening which is positioned proximate said bottom of said reactor tank, which slows a flow of influent entering said tank and discharges said flow against a bottom of said tank beneath said sludge blanket;

so that said influent flows downwardly and outwardly under said sludge blanket without disrupting said blanket.

2. The system of claim 1, further comprising:

a decant assembly having an intake opening for drawing treated wastewater from said tank at a position above said sludge blanket, so that said sludge blanket acts as a cap which prevents said influent from flowing directly from said influent structure to said intake opening of said decant assembly.

3. The system of claim 2, wherein said decant assembly comprises:

a decant float for supporting said intake opening proximate an upper surface of wastewater in said reactor tank.

4. The system of claim 2, further comprising:

at least one aerator assembly for supplying air to said tank during predetermined periods of aerobic treatment.

5. The system of claim 4, wherein said at least one aerator comprises:

an air discharger head which is positioned so as to be located generally beneath said sludge blanket in said reactor tank, so that air supplied through said discharge head disperses and mixes said sludge blanket in said tank during said periods of aerobic treatment.

6. A method for treatment of wastewater, said method comprising the steps of:

forming a sludge blanket in a reactor tank so as to support a population of treatment microbes in said tank; and flowing said influent downwardly through a smoothly tapered conical influent structure having a discharge opening positioned proximate said bottom of said tank, so that said flow is slowed and discharged against a bottom of said tank beneath said sludge blanket;

so that said influent flows downwardly and outwardly under said sludge blanket without disrupting said blanket.

7. The method of claim 6, further comprising the step of:

decanting treated wastewater from said tank through an intake opening which is positioned above said sludge blanket, so that said sludge blanket acts as a cap which prevents said influent from flowing directly from said influent structure to said intake opening;

decanting treated wastewater from said tank through an inlet opening at position above said sludge blanket, so that said sludge blanket acts as a cap which prevents said influent entering said tank from flowing directly to said inlet opening through which said wastewater is being decanted.

8. The method of claim 7, further comprising the steps of:

flowing said influent under said sludge blanket during a predetermined period of decanting said treated wastewater; and dispersing and mixing said sludge blanket in said tank during a predetermined period of wastewater treatment.

9. The method of claim 8, wherein the step of dispersing and mixing said sludge blanket for said predetermined period of wastewater treatment comprises:

discharging air into said tank during a first predetermined period so as to support aerobic treatment of said wastewater; and terminating discharge of air into said tank during a predetermined period so as to allow anoxic treatment of said wastewater.

10. The method of claim 9, wherein the step of discharging air into said tank comprises:

discharging air into said sludge blanket so as to disperse and mix said sludge blanket in said tank.

11. The method of claim 9, further comprising the step of:

allowing said wastewater to settle for a predetermined period so as to form said sludge blanket following said period of treatment.

12. The method of claim 6, further comprising the step of:

flowing said wastewater into said tank from a confined animal facility.

13. The method of claim 12, further comprising the step of:

separating manure solids from said wastewater prior to said wastewater entering said reactor tank.

14. The method of claim 13, further comprising the step of:

returning said wastewater for reuse in said confined animal facility following treatment in said reactor tank.

* * * * *